United States Patent [19]
Carrock

[11] 3,725,332
[45] Apr. 3, 1973

[54] ACRYLONITRILE-BUTADIENE-STYRENE COMPOSITIONS

[75] Inventor: Frederick E. Carrock, Paramus, N.J.

[73] Assignee: Dart Industries Inc., Los Angeles, Calif.

[22] Filed: Dec. 15, 1970

[21] Appl. No.: 98,449

[52] U.S. Cl...260/31.8 M, 260/18 PF, 260/31.8 AN, 260/31.8 DR
[51] Int. Cl. ..........................C08k 1/36, C08d 11/02
[58] Field of Search .260/31.8 M, 31.8 AN, 31.8 DR, 260/880

[56] References Cited

UNITED STATES PATENTS

| | | | |
|---|---|---|---|
| 3,509,237 | 4/1970 | Aubrey | 260/876 B |
| 3,579,612 | 5/1971 | Lowell | 260/880 R |
| 2,776,269 | 1/1957 | Pleuss | 260/31.8 DR |
| 2,957,833 | 10/1960 | Baum | 260/31.2 DR |
| 3,515,692 | 6/1970 | Carrock et al. | 260/33.6 UA |

OTHER PUBLICATIONS

"ABS Resin Manufacture, 1970," C. Placek, Noyes Data Corp., Page 7 relied upon.

"The Behavior of Plasticizers," Mellan, Pergamon Press, 1961 page 9 relied on.

*Primary Examiner*—Morris Liebman
*Assistant Examiner*—S. L. Fox
*Attorney*—Fred S. Valles and Richard A. Dannells, Jr.

[57] ABSTRACT

Compositions which contain a blend of:
a. a first graft copolymer composition derived from the graft copolymerization of a diene-based rubber with, for example, acrylonitrile and styrene, where the rubber has a majority of its particles in the size range of about 0.8 to about 10 micron,
b. a second graft copolymer composition which has a majority of its particles in the size range of 0.005 to about 0.6 micron, and
c. 1 to 10 parts by weight of an epoxidized soybean oil or a mono- or disubstituted phthalic acid ester, e.g., dioctyl phthalate, have been found to have much higher Izod impact strengths at a given melt flow range than similar blends that do not contain the epoxidized soybean oil or phthalic acid ester for the same total rubber concentration in the blend.

9 Claims, No Drawings

ACRYLONITRILE-BUTADIENE-STYRENE COMPOSITIONS

FIELD OF THE INVENTION

This invention relates to the blending of impact resistant resinous compounds to achieve a composition which has outstanding physical properties. More specifically, this invention relates to the blending of two different types of acrylonitrile-butadiene-styrene (hereinafter referred to as ABS) resins with an additive which results in a composition having a much higher impact strength and melt flow than blends that do not contain the additive.

The compositions of this invention are particularly useful in the manufacture of extrusion, sheeting and molding grades of ABS resins.

DESCRIPTION OF THE PRIOR ART

ABS resins prepared by prepolymerizing styrene and acrylonitrile containing a diene-based rubber dissolved therein to convert about 10 to 50 percent of the monomers to polymers and subsequently completing the polymerization (see U.S. Pat. No. 3,515,692) have a disadvantage in that the concentration of the rubber cannot be increased much beyond about 15 percent which, in turn, limits the impact strength of the ABS and its application in industry. ABS resins prepared by polymerizing in an aqueous emulsion the mixture of styrene, acrylonitrile and a rubber latex yield products having a wide range of rubber concentrations, i.e., from about 15 to 60 percent by weight. However, the majority of rubber particles in such materials range in size from 0.005 to about 0.6 microns which tend to greatly increase the rubber concentration required in a particular ABS resin to achieve a given Izod impact strength as compared to ABS resins prepared, for example, by the bulk-suspension techniques described in U.S. Pat. No. 3,515,692.

ABS resins containing sufficient rubber concentration to satisfy the high impact strength requirements of extrusion, sheeting and molding applications result in materials of high melt viscosity which, in turn, limits the processability of the resulting ABS resin. Such an excessive amount of rubber in the ABS resin makes the material more costly, more unstable, and hence, more costly to overcome the instability through the use of expensive antioxidants. The unsaturated rubber used in the ABS resins is inherently more unstable than the styrene-acrylonitrile interpolymers within the resin matrix. A corollary to the problem of the high rubber concentration required to produce high impact strength resins is that the manufacturer must maintain the temperature used to process the resin within narrow limits. For example, the processer must more closely control the extrusion temperature for resins containing a high concentration of rubber to prevent color degradation of the final product than resins containing lower amounts of rubber. In addition, high concentrations of rubber in the ABS resins adversely affect the surface gloss.

In order to overcome some of the disadvantages of each of the foregoing types of resins, the prior art has blended portions of each; see, for example, U.S. Pat. No. 3,509,237. However, it has been found that a blend of a bulk-suspension ABS resin and a latex-based ABS resin having a higher rubber concentration still requires a relatively large amount of the latter to achieve a given high impact strength. Therefore, to a more limited extent, the same disadvantages are present when using these blends that are present with the latex-based ABS resins alone.

SUMMARY OF THE INVENTION

It has been found that the foregoing disadvantages can be overcome by incorporating epoxidized soybean oil or a mono- or disubstituted phthalic acid ester having the formula

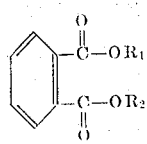

wherein $R_1$ and $R_2$ are each independently selected from the group consisting of an alkyl, aryl, alkyl-aryl having one to 16 carbon atoms and hydrogen or mixtures thereof into a blend of a first graft copolymer composition derived from the graft copolymerization of a diene-based rubber with a monomeric mixture of an ethylenically unsaturated nitrile and a vinyl aromatic hydrocarbon and a second graft copolymer composition similarly derived from an unsaturated rubber and a monomeric mixture of an ethylenically unsaturated nitrile and a vinyl aromatic hydrocarbon. The diene-based rubber in the first graft copolymer has a majority of particles in the size range of about 0.8 to about 10 microns and the unsaturated rubber in the second graft copolymer composition has a majority of particles in the range of 0.005 to about 0.6 micron.

The incorporation of epoxidized soybean oil or the phthalic acid ester into the blend permits one to greatly reduce the amount of rubber required in the blend to achieve the same impact strength for a given melt flow. A secondary advantage of this incorporation is the reduction of the melt viscosity and the improvement of the stability and gloss of the blend.

PREFERRED EMBODIMENTS

In a preferred embodiment of this invention, a composition is formed comprising a blend of:

a. 25 to 95 parts by weight of a first graft copolymer derived from the graft copolymerization of a diene-based rubber with a monomeric mixture of acrylonitrile and styrene, b. 75 to 5 parts by weight of a second graft copolymer composition derived from the graft copolymerization of a diene latex-based rubber with a monomeric mixture of acrylonitrile and styrene, and c. 1 to 10 parts by weight of a disubstituted phthalic acid ester having the formula:

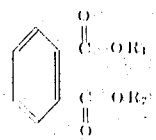

wherein $R_1$ and $R_2$ are both straight or branched chain alkyls having six to 10 carbon atoms.

The diene-based rubber of the first graft copolymer ranges in an amount of from about 3 to 15 percent by weight of the copolymer and the diene latex-based rubber of the second graft copolymer ranges in the amount from about 10 to 60 percent by weight. It is preferred that the diene-based rubber of the first graft copolymer is a linear polybutadiene having a cis-1,4 content of at least 30 percent and up to about 98 percent by weight based on the polybutadiene.

The first graft copolymer is preferably prepared by prepolymerizing the monomeric mixture of the ethylenically unsaturated nitrile and the vinyl aromatic hydrocarbon containing the diene-based rubber dissolved therein to convert about 10 to 50 percent of the monomers to polymers and substantially completely polymerizing the resulting prepolymer in a subsequent polymerization step.

The second graft copolymer is preferably prepared by graft polymerizing the same type of monomeric mixture onto a diene latex-based rubber in an aqueous emulsion.

Examples of the unsaturated nitriles which are useful in the compositions of the present invention include acrylonitrile, methacrylonitrile, ethacrylonitrile and mixtures thereof. The vinyl aromatic hydrocarbons used in the composition of this invention include the alkyl and/or halogen derivatives of styrene including the methylstyrenes, ethylstyrenes, isopropylstyrenes, butylstyrenes including the mono- and disubstituted alkyl forms, the mono- and dichlorostyrenes as well as the mono- and dibromostyrenes and alkyl halogen styrenes or mixtures of these compounds with styrene or with each other.

The diene-based rubber used in the first graft copolymer compositions include synthetic rubbers, such as SBR-type rubbers, which are copolymers of styrene and butadiene having 60 to 95 percent by weight of butadiene and from 40 to 5 percent of styrene; solution-polymerized linear random or block copolymer type SBR's wherein stereospecific catalysts are used and wherein the amount of butadiene can vary from 60 to 95 percent by weight of the monomeric mixture and in the more preferred embodiment, from about 70 to 95 weight percent; nitrile type rubbers containing from 55 to 82 percent by weight of butadiene and from 45 to 18 percent acrylonitrile; rubbery homopolymers of butadiene and of isoprene; the rubbery copolymers of isobutylene combined with butadiene or isoprene; and rubbery terpolymers of ethylene, propylene and a minor amount of a diene monomer such as cyclopentadiene or ethylidene norbornene. The preferred rubbery material is a linear polybutadiene having a cis (polymerized by 1,4 addition) content of about 30 to 98 weight percent, preferably 35 to 60 weight percent.

The epoxidized soybean oil or epoxidized soya oil which can be substituted in place of the phthalic acid ester in the composition of the present invention has a molecular weight of about 1,000, a specific gravity of 0.99 – 1.00 at 20°C and a melting point of about 0°C ± 10°C.

Examples of the mono- and disubstituted phthalic acid esters suitable for the compositions of this invention include the following: dimethyl phthalate, diethyl phthalate, dipropyl phthalate, dibutyl phthalate, di-isobutyl phthalate, diamyl phthalate, dihexyl phthalate, dimethylisobutylcarbinyl phthalate, butyl octyl phthalate, butyl isodecyl phthalate, butyl isohexyl phthalate, dioctyl phthalate, di-n-octyl phthalate, dioctyl isophthalate, di-isooctyl isophthalate, di-isooctyl phthalate, dicapryl phthalate, di-(2-ethylhexyl) phthalate, dinonyl phthalate, n-octyl-n-decyl phthalate, octyl decyl phthalate, di-decyl phthalate, ditridecyl phthalate, ditridecyl phthalate, decyltridecyl phthalate, ethylhexyldecyl phthalate, butyl ethylhexyl phthalate, diallyl phthalate, dihydrobiethyl phthalate, butyl cyclohexyl phthalate, butyl benzyl phthalate, dicyclohexyl phthalate, di(methylcyclohexyl) phthalate, diphenyl phthalate, 2-ethyl hexyl isodecyl phthalate, dibutoxyethyl phthalate, diethoxyethyl phthalate, di)ethoxyethoxyethyl) phthalate, dibutoxyethyl phthalate, bis-(diethylene glycol monoethyl ether) phthalate, methycyclohexyl isobutyl phthalate.

The most preferred phthalic acid esters of this invention are di-2-ethylhexyl phthalate or dioctyl phthalate (DOP) and the closely related phthalates including di-isooctylphthalate and di-isodecyl phthalate.

The use of a bulk prepolymerization-suspension process is preferred in preparing the first graft copolymer in which styrene and acrylonitrile are added to a reaction zone in the ratio of about 20 to 40 parts by weight of the acrylonitrile to 80 to 60 parts by weight of styrene. A finely ground monomer-soluble diene-based rubber in the amount from about 3 to 15 percent based on the weight of the total mixture in the reaction zone including the rubber is then dissolved in the monomeric mixture with agitation. Antioxidants such as trisnonylphenyl phosphite and butylated hydroxytoluene, lubricants and inert fillers can be added to the mixture in the reaction zone.

In a particularly preferred embodiment of this invention, the epoxidized soybean oil or the mono- or disubstituted phthalic acid ester in the amount from about 1 to 20 percent based on the weight of the total mixture in the reaction zone can be incorporated into the solution at this stage of the process. A mercaptan chain regulator, for example, nonyl, decyl, or dodecyl mercaptan, in an amount of from about 0.01 up to about 2.0 percent based on the weight of the total mixture in the reaction zone, preferably from 0.02 to 0.4 percent, is added at this stage of the polymerization. The polymerization is commenced either thermally or using a peroxide initiator of the oil-soluble type. In the case of thermal initiation, the temperature range can be from about 90° to 120°C, preferably 100° to 110°C, and in the case of the peroxide initiation, the temperature can range from about 60° to 120°C, preferably from about 75° to 90°C. The polymerization is continued until from about 15 to 50 percent by weight of the monomers are polymerized in the mixture in the reaction zone. The prepolymerization step generally takes from about 3 to 6 hours. If included in the reaction, the peroxide initiator is preferably used in amounts from about 0.01 to 0.15 percent by weight based on the total mixture in the reaction zone. During the prepolymerization step, the components in the prepolymerizer are thoroughly agitated to properly disperse the diene-based rubber as it precipitates out of solution.

After prepolymerizing to the desired conversion level, the prepolymer is suspended in an aqueous system containing suspension stabilizers and the polymerization is completed to form the bulk-suspension ABS blending component. Peroxide initiators are used in the suspension polymerization step to substantially complete the polymerization. Details of the suspension polymerization step can be found in U.S. Pat. No. 3,515,692, which is incorporated herein by reference.

The first graft copolymer can also be prepared by a solution-polymerization process in which a suitable diluent is added to the reaction zone along with the monomers. An alkyl aromatic diluent having preferably one alkyl group containing two carbon atoms or more which is liquid at ambient temperatures is a suitable diluent for this process. The preferred diluent when one of the monomers is styrene, has a boiling point greater than 110°C, and preferably in the range of 130° to 200°C, i.e., diethylbenzene, methylethylbenzene and ethylbenzene being especially preferred. The amount of diluent used in the solution polymerization step can range from 3 to 30 percent based on the weight of the mixture in the reaction zone. Preferably the amount is not less than about 5 percent in the case of low rubber content formulations, e.g., medium impact ABS blending components, and not more than about 25 weight percent in the case of higher rubber content formulations, e.g., the high impact ABS blending components. The temperatures used during the solution polymerization step usually range from 60° to 180°C. Temperatures of at least 60°C are used in the case of peroxide-initiated reactions and at least 100°C in the case of thermal initiated reactions. In the solution polymerization process an additional step of devolatilization is required to remove the solvent from the product mixture. After the polymerization is complete the polymer-diluent mixture is transferred to a system comprising, for example, a heat exchanger and a devolatilizer where the mixture is heated in either a batch or a continuous manner. The devolatilizer is operated at temperatures in the range of about 200° to 240°C at reduced pressures of from about 5 to 360 mm Hg. These conditions are suitable to devolatilize the diluent, unreacted monomers and other volatile materials which would be detrimental in the finished blending component. The devolatilized polymer can be directed to a diehousing or melt fed into an extruder or other apparatus for converting the melt to the suitable form for blending.

A bulk or solution prepolymerization step may or may not be combined with the suspension polymerization step to complete the polymerization. It is possible to carry out the entire polymerization with a straight bulk, solution or suspension polymerization or any combination of these techniques to prepare the ABS blending components that contain about 3 to 15 weight percent of the diene-based rubber and have the majority of particles in the size range of from about 0.8 to about 10 microns.

The second graft copolymer is preferably prepared in a latex or emulsion polymerization process in which an aqueous mixture is formed comprising butadiene; an emulsifier such as an alkali metal fatty acid, e.g., potassium oleate; potassium or ammonium persulfate as the initiator; a mercaptan as the molecular weight modifier; and a small quantity of a base, e.g., potassium hydroxide with or without a buffer such as trisodium phosphate, to maintain the pH sufficiently high to prevent hydrolysis of the emulsifier. Chelating agents such as ethylenediamine-tetraacetic acid (EDTA) or one of its salts, such as the trisodium or tetrasodium salts, may also be added as a chelating agent to prevent side reactions and latex instability caused by multivalent metal ions. The reaction is classified as a "hot" polymerization recipe as distinguished from a "cold" recipe which usually employs a redox catalyst system consisting of a peroxide, ferrous ion and a reducing agent.

The "hot" polymerization is carried out at about 50°C with agitation for about 10 to 20 hours to yield a latex with 60 to 90 weight percent or greater of butadiene converted to polybutadiene. In this case the unreacted butadiene can be flashed or stripped off by a variety of conventional means. In the "hot" polymerization reaction, additional soap can be added during or after the polymerization to polybutadiene to further stabilize the rubber particles. Soaps such as dodecylamine hydrochloride can be used in which case the pH is maintained below 7 by the use of water-soluble acids. Also, non-ionic soaps may be used over any desired pH range.

The acrylonitrile and styrene monomers are grafted onto the latex-based polybutadiene preformed as described in the above two paragraphs or purchased directly. The grafting process may require additional initiators, modifiers, soaps and buffers to form the desired latex-based ABS blending component. This component can be recovered by conventional means such as coagulation or spray drying.

In addition to polybutadiene latex, other latices can be used to form the latex-based ABS blending component such as natural rubber, styrene-butadiene copolymer (SBR), butadiene-acrylonitrile copolymer and isoprene. In the case of SBR latex, the SBR rubber contains from 5 to 40 percent by weight styrene and in the case of the butadiene-acrylonitrile copolymer latex, the rubber contains from about 10 to 50 percent by weight acrylonitrile.

The latex process produces a second graft copolymer wherein the majority of the rubber particles are in the range from 0.005 to about 0.6 micron and a total rubber content of from about 10 to 60 percent by weight. More preferably this latex-based blending component has a majority of the rubber particles in the size range of 0.05 to 0.3 micron.

In addition to the first and second graft copolymer compositions, other known copolymers can be incorporated into the blend of this invention to adjust the overall rubber content of the final composition. One example is a styrene-acrylonitrile copolymer in an amount of about 5 to 50 percent based on the total weight of the final blend. The styrene-acrylonitrile copolymer can be prepared by any known technique such as solution emulsion or suspension polymerization. The styrene to acrylonitrile weight ratio in the copolymer ranges from about 85 to 15 to about 60 to 40.

The first and second graft copolymers along with the styrene-acrylonitrile copolymer, if desired, are blended in any conventional manner such as in a Henschel type mixer or double cone blender followed by melt blending in a Banbury, Farrell continuous mixer, or a single or twin screw extruder. The epoxidized soybean oil or the phthalic acid ester can be incorporated at the blending stage if this additive has not been incorporated into one or both of the blending components during the polymerization stage, along with the appropriate solid stabilizers, lubricants and other additives by dry tumbling the additives with the ABS blending components to effect intimate mixing. The thoroughly dry mixture blend is then extruded in, for example, a vented single screw extruder and pelletized to form the final composition.

In the specific Examples which illustrate the novel composition of this invention the following properties are measured and when measured the units and designation are indicated below:

| Properties | ASTM | Units | Test Conditions |
|---|---|---|---|
| Melt Flow | D-1238 | gm/10 min. | 230°C/5000gms wt. |
| Izod Impact Strength | D-256 | ft. lbs./in. notch* | injection molded samples ⅛" by ½" by 5" molded according to ASTM D-647 |
| Tensile Yield | 638 | psi | |
| Tensile Failure | D-638 | psi | |
| Elongation | D-638 | % | |
| Rockwell R Hardness | D-785 | | |

(*) Bar is divided and Dead End not Gate End values are reported.

In the compositions of the Examples and Controls the bulk-suspension ABS had a majority of its particles in the size range of from about 0.8 to 4 microns and was prepared by the procedure set forth in U.S. Pat. No. 3,515,692 and the latex-based ABS had a majority of its particles in the size range of about 0.05 to 0.3 micron and was prepared in accordance with standard emulsion techniques as described under PREFERRED EMBODIMENTS.

EXAMPLE 1

Compositions 1 through 9 of this Example contain either 2 percent (Composition 9) or 4 percent by weight of commercially available dioctyl phthalate (DOP), either 14.5 or 17 percent by weight of a commercially available latex-based ABS prepared as indicated in the above paragraph, and a commercially available bulk-suspension ABS making up the balance of the blend. Compositions 1 through 9 are prepared by combining in a double cone blender the two types of graft copolymers and a stabilizer mixture comprising 0.17 part butylated hydroxytoluene and 0.03 part calcium stearate based on 100 parts of the finished blend. The amount of DOP necessary to result in a final blend containing 4 percent DOP is divided into three streams and intermittently added to the composition in the blender at 3-minute intervals. The composition is then tumbled for an additional period of time until the DOP has been thoroughly incorporated into the blend. The physical properties obtained for the 9 compositions of this Example are set forth in Table I below:

TABLE I

| Compositions | 1 | 2 | 3 | 4 | 5 |
|---|---|---|---|---|---|
| Bulk Suspension ABS, wt. % | 81.5* | 81.5* | 81.5* | 81.5* | 79* |
| Latex-Based ABS, wt.% | 14.5** | 14.5** | 14.5** | 14.5** | 17** |
| Dioctyl Phthalate, wt.% | 4 | 4 | 4 | 4 | 4 |
| Total Rubber, wt.% | 14 | 14 | 14 | 14 | 15 |
| Melt Flow, g./10min. | 6.4 | 7.0 | 7.1 | 6.3 | 7.7 |
| Izod Impact, ft.-lb./in.notch | 4.5 | 3.7 | 4.5 | 4.7 | 6.9 |
| Tensile Yield, psi | 4750 | 5000 | 4900 | 4900 | 5280 |
| Tensile Fail, psi | 4340 | 4200 | 4230 | 4160 | 4440 |
| Elongation, % | 34.5 | 19.3 | 33.0 | 24.0 | 32.5 |
| Rockwell Hardness R | 98.0 | 101.0 | 99.0 | 102.0 | 103 |

* Contains 8.8 wt.% linear polybutadiene having 35 wt.% cis-1,4 content and a Mooney viscoisity of 55.
** Contains about 47 wt.% emulsion polymerized butadiene.
*** Contains 9.0 wt.% linear polybutadiene having 35 wt.% cis-1,4 content and a Mooney viscosity of 55.

| Compositions | 6 | 7 | 8 | 9 |
|---|---|---|---|---|
| Bulk Suspension ABS, wt.% | 79* | 79* | 79* | 83.5*** |
| Latex-Based ABS, wt.% | 17** | 17** | 17** | 14.5** |
| Dioctyl Phthalate, wt.% | 4 | 4 | 4 | 2 |
| Total Rubber, wt.% | 15 | 15 | 15 | 14.3 |
| Melt Flow, g./10min. | 7.7 | 6.8 | 9.3 | 5.2 |
| Izod Impact, ft.-lb./in.notch | 6.5 | 6.6 | 7.8 | 5.0 |
| Tensile Yield, psi | 4890 | 4970 | 5390 | 4910 |
| Tensile Fail, psi | 5290 | 4410 | 4570 | 4390 |
| Elongation, % | 32.6 | 39.6 | 34.2 | 37.8 |
| Rockwell Hardness R | 100 | 99.5 | 103.8 | 102 |

* Contains 8.8 wt.% linear polybutadiene having 35 wt.% cis-1,4 content and a Mooney viscoisity of 55.
** Contains about 47 wt.% emulsion polymerized butadiene.
*** Contains 9.0 wt.% linear polybutadiene having 35 wt.% cis-1,4 content and a Mooney viscosity of 55.

Table II below sets forth the compositions and physical properties for Control Compositions A through I. Each of the Control Compositions were prepared in the same manner as the compositions of Example 1 except that stabilizer mixture was varied depending on the rubber concentration of the blend. In Control Compositions A through D, which contained 13.3 percent by weight of polybutadiene rubber (hereafter referred to as rubber), 0.2 parts butylated hydroxytoluene and 0.05 parts calcium stearate were incorporated per 100 parts of the blend. In Control Compositions E and F containing 13.9 percent by weight of rubber, 0.25 parts butylated hydroxytoluene, 0.1 part alkylidene bis polyphenol sold under the trademark "Plastonox 425" by American Cyanamid, 0.2 part dilauryl thiodipropionate, 0.05 part calcium stearate and 0.5 part ethylene bis stearamide sold under the trademark "Acrowax C" by Glyco Chemical Company, were incorporated per 100 parts of finished resin. Control Compositions G, H and I each contained 35 percent by weight of a commercially available styrene-acrylonitrile copolymer (72/28 weight ratio) obtained by a suspension polymerization process. These three compositions (G, H and I) which contained over 18 percent by weight of rubber had the same additive composition as E and F except that the level of calcium stearate was 0.05 part per 100 parts of resin.

TABLE II

| | A | B | C | D | E |
|---|---|---|---|---|---|
| | | Control Compositions | | | |
| Bulk Suspension ABS,wt.% | 86* | 86* | 86* | 86* | 87* |
| Latex-Based ABS,wt.% | 14** | 14** | 14** | 14** | 13** |
| SAN, wt.% | | | | | |
| Dioctyl Phthalate,wt.% | | | | | |
| Total Rubber,wt.% | 13.3 | 13.3 | 13.3 | 13.3 | 13.9 |
| Melt Flow,g./10min. | 3.9 | 4.0 | 4.0 | 5.0 | 5.4 |
| Izod Impact,ft.-lb./in.notch | 3.3 | 3.3 | 3.6 | 3.8 | 3.5 |
| Tensile Yield,psi | 5940 | 5360 | 5910 | 5760 | N.A. |
| Tensile Fail,psi | 5320 | 4830 | 5230 | 5140 | N.A. |
| Elongation,% | 30.3 | 26.4 | 30.4 | 32.1 | N.A. |
| Rockwell Hardness R | 105 | 100.5 | 104 | 105 | N.A. |

\* Contains 9.0 wt.% linear polybutadiene having 35 wt.% cis-1,4 content and a Mooney viscosity of 55.
\*\* A blend of 2/3 part by weight of a latex-based ABS containing 60 wt.% butadiene and 1/2 part of weight of a SAN copolymer having a styrene to acrylonitrile weight ratio of 72/28.
\*\*\* Contains about 47 wt.% of emulsion polymerized butadiene.
\*\*\*\* Contains 8.0 wt.% linear polybutadiene having 35 wt.% cis-1,4 content and a Mooney viscosity of 55.

| | F | G | H | I |
|---|---|---|---|---|
| | | Control Compositions | | |
| Bulk Suspension ABS,wt.% | 87* | 32**** | 32* | 32* |
| Latex-Based ABS,wt.% | 13*** | 33*** | 33*** | 33*** |
| SAN, wt.% | | 35 | 35 | 35 |
| Dioctyl Phthalate,wt.% | | | | |
| Total Rubber,wt.% | 13.9 | 18.1 | 18.4 | 18.4 |
| Melt Flow,g./10min. | 5.6 | 6.9 | 4.7 | 3.3 |
| Izod Impact,ft.-lb./in.notch | 3.7 | 4.2 | 5.6 | 4.7 |
| Tensile Yield,psi | N.A. | 5360 | 5470 | 5660 |
| Tensile Fail,psi | N.A. | 4440 | 4780 | 4580 |
| Elongation,% | N.A. | 9.1 | 15.1 | 20.7 |
| Rockwell Hardness R | N.A. | 100 | 98.0 | 95.0 |

\* Contains 9.0 wt.% linear polybutadiene having 35 wt.% cis-1,4 content and a Mooney viscosity of 55.
\*\*\* A blend of 2/3 part by weight of a latex-based ABS containing 60 wt.% butadiene and 1/2 part by weight of a SAN copolymer having a styrene to acrylonitrile weight ratio of 72/28.
\*\*\* Contains about 47 wt.% of emulsion polymerized butadiene.
\*\*\*\* Contains 8.0 wt.% linear polybutadiene having 35 wt.% cis-1,4 content and a Mooney viscosity of 55.

On comparing the data of Tables I and II, the control compositions have melt flows and Izod impact strengths which are considerably lower than the corresponding melt flows and Izod impact strengths for the compositions of this invention for a given rubber concentration in the total blend. The average melt flow for Compositions 1 through 4 of Example 1 is 6.7 and the corresponding average Izod impact strength for these compositions is 4.35 for a rubber concentration in the total blend of 14 percent by weight. The averages for these compositions can be directly compared to the average melt flow of 4.2 and average Izod impact strength of 3.5 for Control Compositions A through D which have a rubber concentration of 13.3 percent by weight. Compositions 1 through 4 can also be compared to Control Compositions E and F which have an average melt flow of 5.5 and an Izod impact strength of 3.6 for a blend containing 13.9 percent by weight rubber. Similarly, Composition 9 which has one-half the DOP content of the other compositions of this Example, still has a much greater Izod impact strength for the same or lower melt flow and for a rubber concentration of 14.3 percent by weight than any of the Control Compositions A through F.

The average melt flow and the Izod impact strength for Compositions 5 through 8 of Example 1 are 7.9 and 6.95 respectively for a final blend containing 15% by weight rubber. These compositions can be compared to Control Compositions G, H and I which have an average melt flow of 4.0 and an average Izod impact strength of 5.2 for a final blend averaging 18.3 percent by weight rubber. This illustrates that even where the average rubber concentration of the control is over 20% greater than the compositions of this invention, the melt flows and the Izod impact strengths of the latter are considerably higher.

The above Tables illustrate the unexpected nature of incorporated DOP into a blend of a bulk-suspension ABS and a latex-based ABS in which the resulting composition contains not only a higher melt flow but a higher Izod impact strength for an equivalent rubber concentration. This result is completely contrary to the prior art in which impact strength improvers generally lower the melt flow as they increase the impact strength of a resin composition.

EXAMPLE 2

This Example illustrates blending a varying amount of DOP, i.e., within the range of 3 to 5 percent by weight, to produce low to medium melt flow, high Izod impact strength blends of bulk suspension ABS and latex-based ABS. Compositions 10 through 15 of this Example were prepared in the same manner as the Compositions of Example 1 except that the following additives were incorporated into the blend in a dry mix blender in place of the 0.17 part butylated hydroxytoluene and 0.3 part calcium stearate: 0.25 part butylated hydroxytoluene, 0.1 part alkylidene bis polyphenol sold under the trademark "Plastonox 425" by American Cyanamid, 0.2 part dilauryl thiodipropionate, 0.25 part calcium stearate and 0.5 part ethylene bis stearamide sold under the trademark "Acrowax C" by Glyco Chemical Company. The physical properties of Compositions 10 through 15 are set forth in Table III:

TABLE III

| | Compositions | | | | | |
|---|---|---|---|---|---|---|
| | 10 | 11 | 12 | 13 | 14 | 15 |
| Bulk suspension ABS, weight percent | ¹89 | ¹89 | ¹89 | ²75 | ²80 | ²82 |
| Latex-based ABS, weight percent | ³8 | ³8 | ³8 | ⁴20 | ⁴15 | ⁴15 |
| Dioctyl phthalate, weight percent | 3 | 3 | 3 | 5 | 5 | 3 |
| Total rubber, weight percent | 13.0 | 13.0 | 13.0 | 15.4 | 13.5 | 13.6 |
| Melt flow, grams/10 minutes | 1.3 | 1.1 | 1.1 | 0.7 | 2.4 | 1.9 |
| Izod impact, ft.-lb./in. notch | 5.7 | 5.1 | 6.4 | 4.9 | 3.8 | 3.6 |
| Tensile yield, p.s.i. | 3,500 | 3,660 | 3,790 | 3,950 | 4,280 | 4,660 |
| Tensile fail, p.s.i. | 3,510 | 4,000 | 4,120 | 3,960 | 3,670 | 4,290 |
| Elongation, percent | 31.8 | 40.0 | 42.9 | 43.0 | 33 | 42 |
| Rockwell Hardness R | 82.0 | 81.0 | 87.0 | 88.0 | 95.5 | 91.0 |

¹ Contains 11 weight percent linear polybutadiene having 35 weight percent cis-1,4 content and a Mooney viscosity of 55.
² Contains 8.0 weight percent linear polybutadiene having 35 weight percent cis-1,4 content and a Mooney viscosity of 55.
³ A blend of ⅔ part by weight of a latex-based ABS containing 60 weight percent butadiene and ⅓ part by weight of a SAN copolymer having a styrene to acrylonitrile weight ratio of 72/28.
⁴ Contains about 47 weight percent of emulsion polymerized butadiene.

Table IV below sets forth the compositions and physical properties for Control Compositions J and K which were prepared in the same manner and contain the same additives as the Example 2 Compositions.

The data of Table III when compared to Table IV further illustrates the unexpectedly high Izod impact strength and melt flow of blends containing DOP. Specifically, Control Composition J illustrates that over 22 percent by weight of rubber is required to produce a low melt flow composition of approximately the same physical properties as Compositions 10–12 containing 13 percent by weight rubber. Similarly, Control Composition K shows that over 16 percent by weight of rubber is necessary to produce a medium melt flow composition of approximately the same physical properties as Composition 14 and 15 containing less than 14wt. percent rubber.

TABLE IV

| | Control Composition | |
|---|---|---|
| | J | K |
| Bulk Suspension ABS,wt.% | 65* | 50** |
| Latex-Based ABS,wt.% | 35*** | 27*** |
| SAN, wt.% | | 23 |
| Dioctyl Phthalate,wt.% | | |
| Total Rubber,wt.% | 22.3 | 16.7 |
| Melt Flow,g./10min. | 1.0 | 2.0 |
| Izod Impact,ft.-lb./in.notch | 6.1 | 4.6 |
| Tensile Yield,psi | 4270 | 5420 |
| Tensile Fail,psi | 3680 | 4440 |
| Elongation,% | 15.0 | 10.2 |
| Rockwell Hardness R | 72.6 | 101 |

\* Contains 9.0 wt.% linear polybutadiene having 35 wt.% cis-1,4 content and a Mooney viscosity of 55.
 \*\* Contains 8.0 wt.% linear polybutadiene having 35 wt,% cis-1,4 content and a Mooney viscosity of 55.
 \*\*\* Contains about 47 wt.% emulsion polymerized butadiene.

EXAMPLE 3

In this Example employing an ABS composition similar to the ones employed in Example 2 above, a pipe grade composition was prepared by incorporating carbon black in an amount of about 0.8 percent based on the weight of the composition. The composition was extruded into 4 inch pipe with excellent processability. The pipe exhibited a smooth matte finish. Table V below sets forth the physical properties obtained on this composition:

TABLE V

| | Composition 16 |
|---|---|
| Bulk Suspension ABS,wt.% | 90* |
| Latex-Based ABS,wt.% | 5** |
| Dioctyl Phthalate,wt.% | 5 |
| Total Rubber,wt.% | 12.2 |
| Melt Flow,g./10min. | 1.5 |
| Izod Impact,ft.-lb./in.notch | 6.6 |
| Tensile Yield,psi | 5170 |
| Tensile Fail,psi | 5910 |
| Elongation,% | 37.9 |
| Rockwell Hardness R | 83 |
| Drop Impact,ft.lb. | 40 |

\* Contains 11wt.% linear polybutadiene having 35 wt.% cis-1,4 content and a Mooney viscosity of 55.
 \*\* Contains about 47wt.% of emulsion polymerized butadiene.

EXAMPLE 4

This example illustrates the embodiment of this invention in which DOP was introduced into the prepolymerization step in the preparation of the bulk-suspension ABS blending component. Linear polybutadiene of the type described in Tables I through V above was dissolved in a monomeric mixture of styrene and acrylonitrile containing mineral oil, trisnonylphenyl phosphite and butylated hydroxytoluene. The solution was transferred to a prepolymerizer, EDTA and DOP were added and the solution was heated to 114°C. After the reaction mixture had reached 90°C t-dodecyl mercaptan was introduced and the prepolymerization was continued until the prepolymer mixture reached a total solids content of 30wt. percent. The prepolymer mixture was then transferred to a suspension vessel. The prepolymer was added to this vessel in ratio of 100 pounds of prepolymer per 100 pounds of water and then 0.55 pound of hydroxyethyl cellulose sold under the trademark "Natrosol HR", and 0.15 pound of t-butyl perbenzoate were added to the vessel.

The polymerization was substantially completed after the following cycle:

| Hours | Temp., °C |
|---|---|
| 1.5 | 85 – 105 |
| 2.5 | 105 |
| 1.5 | 105 – 147 |
| 1.0 | 147 |

The resulting polymer was dewatered and dried. Table VI below sets forth the compositions of each of the prepolymers and the resulting physical properties of Bulk-suspension ABS Blending Components 1 and 2.

13

TABLE VI

| Ingredients (in parts by weight) | Blending Components 1 | 2 |
|---|---|---|
| Styrene | 65.4 | 65.4 |
| Acrylonitrile | 21.8 | 21.8 |
| Polybutadiene | 11.0 | 11.0 |
| Mineral Oil | 1.5 | 1.5 |
| Trisnonylphenyl phosphite | 0.25 | 0.25 |
| Butylated hydroxytoluene | 0.05 | 0.05 |
| EDTA | 0.085 | 0.085 |
| t-dodecyl mercaptan | 0.15 | 0.15 |
| DOP | 2.5 | 5 |
| Physical Properties | | |
| Melt Flow,g./10min. | 1.2 | 2.0 |
| Izod Impact,ft.-lb./in.notch | 4.2 | 5.2^h- |

* Denotes hinge break on Izod test.

The Bulk-suspension ABS Blending Components 1 and 2 were blended with the latex-based ABS containing about 47 weight percent emulsion polymerized butadiene in the same manner as described under Example 1. The melt flow and the Izod impact strength for each of the two resulting compositions are set forth in Table VII below:

TABLE VII

| | Compositions 17 | 18 |
|---|---|---|
| Component 1* Bulk Suspension ABS,wt.% | 82 | |
| Component 2** Bulk Suspension ABS,wt.% | | 80 |
| Latex-Based ABS,wt.% | 18 | 20 |
| Total Rubber,wt.% | 17.25 | 17.8 |
| Melt Flow,g./10min. | 0.8 | 1.0 |
| Izod Impact,ft.lb./in.notch | 8.7^h*** | 8.8^h*** |

* Contains 2.5wt.% DOP.
** Contains 5.0wt.% DOP.
*** Denotes hinge break on Izod test.

The process described under Example 4 was repeated except that no DOP was added during the prepolymerization step. Instead the DOP was combined with the bulk-suspension ABS and the latex-based ABS during the blending as indicated under Example 1. Table VIII below sets forth the results for each of the resulting compositions which are to be compared to Compositions 17 and 18. This comparison indicates that while Compositions 17 through 20 all had very high Izod impact strengths, Compositions 19 and 20 had lower melt flows than Compositions 17 and 18. This indicates that adding DOP during the polymerization of one of the components results in an improved composition over the composition resulting from adding the DOP during the blending.

TABLE VIII

| | Compositions 19 | 20 |
|---|---|---|
| Bulk Suspension ABS,wt.% | 80 | 76 |
| Latex-Based ABS,wt.% | 18 | 20 |
| Dioctyl Phthalate,wt.% | 2 | 4 |
| Total Rubber,wt.% | 17.25 | 17.8 |
| Melt Flow,g./10min. | 0.3 | 0.4 |
| Izod Impact,ft.lb./in.notch | 9.1^h- | 9.2^h- |

* Denotes hinge break on Izod Test.

The foregoing Examples illustrate the significant property improvement obtained for ABS compositions following the teachings herein. Resort can be had to modiciations and equivalents falling within the scope of this invention and the appended claims.

What is claimed is:

1. A composition of matter comprising a blend of:
   a. 25 to 95 parts by weight of a first graft copolymer composition derived from the graft copolymerization of a diene-based rubber with a monomeric mixture of acrylonitrile and styrene, said diene-based rubber having a majority of particles in the size range of from about 0.8 to about 10 microns and ranging in an amount of from about 3 to 15 percent by weight of said first graft copolymer,
   b. 75 to 5 parts by weight of a second graft copolymer composition derived from the graft copolymerization of a diene latex-based rubber with a monomeric mixture of acrylonitrile and styrene, said diene latex-based rubber having a majority of particles in the size range of 0.005 to 0.6 micron and ranging in an amount of from about 10 to 60 percent by weight of said second graft copolymer, and
   c. 1 to 10 parts by weight of a mono- or disubstituted phthalic acid ester having the formula:

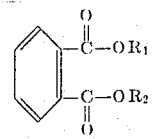

wherein $R_1$ and $R_2$ are each independently selected from the group consisting of an alkyl, aryl, alkyl-aryl having one to 16 carbon atoms and hydrogen; or mixtures thereof.

2. The composition of claim 1 wherein said additive is a di-substituted phthalic acid ester having said formula and wherein $R_1$ and $R_2$ of said formula are both alkyls having eight carbon atoms.

3. The composition of claim 1 containing 5 to 100 parts by weight of styrene-acrylonitrile copolymer.

4. The composition of claim 1 wherein said diene-based rubber is a linear polybutadiene having a cis-1,4 content of at least 30 and up to about 98 weight percent and the amount of said linear polybutadiene ranges from about 3 to 15 percent by weight of said first graft copolymer and wherein said diene latex-based rubber is a polybutadiene derived from latex polymerization and the amount of said polybutadiene ranges from about 10 to 60 percent by weight of said second graft copolymer.

5. A composition of matter comprising a blend of:
   a. 25 to 95 parts by weight of a first graft copolymer composition derived from prepolymerizing a mono-meric mixture of an ethylenically unsaturated nitrile and vinyl aromatic hydrocarbon containing a diene rubber dissolved therein to convert about 10 to 50 percent of the monomers to polymers and substantially completely polymerizing the resulting prepolymer in a subsequent polymerization step,
   b. 75 to 5 parts by weight of a second graft copolymer composition derived from graft polymerizing a monomeric mixture of an ethylenically unsaturated nitrile and a vinyl aromatic hydrocarbon onto an unsaturated latex-based rubber in an aqueous emulsion, and
   c. 1 to 10 parts by weight of a mono- or disubstituted phthalic acid ester having the formula:

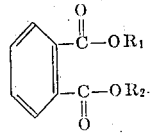

wherein $R_1$ and $R_2$ are each independently selected from the group consisting of an alkyl, aryl, alkyl-aryl having one to 16 carbon atoms and hydrogen or mixtures thereof.

6. The composition of claim 5 wherein said additive is ad disubstituted phthalic acid ester having said formula and wherein $R_1$ and $R_2$ of said formula are both alkyls having 8 carbon atoms.

7. The composition of claim 5 wherein said diene rubber is a linear polybutadiene having a cis-1,4 content of at least 30 and up to about 98 weight percent, and said unsaturated latex-based rubber is polybutadiene derived from latex polymerization, wherein the amount of said linear polybutadiene ranges from about 5 to 15 percent by weight of said first graft copolymer and said polybutadiene ranges from about 20 to 60 percent by weight of said second graft copolymer and wherein said monomeric mixture comprises acrylonitrile and styrene.

8. A process for preparing a high impact strength composition which comprises:
  a. adding to a prepolymerization zone in an amount such that said high impact composition contains 1 to 10 percent by weight of a mono- or disubstituted phthalic acid ester having the formula:

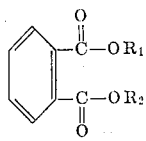

wherein $R_1$ and $R_2$ are each independently selected from the group consisting of an alkyl, aryl, alkyl-aryl having one to 16 carbon atoms and hydrogen or mixtures thereof, and a solution of from about 3 to 15 percent based on the weight of the total mixture in said prepolymerization zone of a diene rubber dissolved in a monomeric mixture of an ethylenically unsaturated nitrile and a vinyl aromatic hydrocarbon,
  b. prepolymerizing said mixture in said prepolymerization zone in the presence of a mercaptan chain regulator at a temperature in the range of about 60° to 120°C until from about 10 to 45 percent by weight of the monomers in said mixture are converted to polymers,
  c. substantially completely polymerizing said prepolymerized mixture at a temperature in the range of about 60° to 145°C in a subsequent polymerization zone,
  d. recovering a first graft copolymer from said subsequent polymerization zone, and
  e. blending 25 to 95 parts by weight of said first graft copolymer with 75 to 5 parts by weight of a second graft copolymer derived from polymerizing a monomeric mixture of an ethylenically unsaturated nitrile and a vinyl aromatic hydrocarbon onto an unsaturated latex-based rubber in an aqueous emulsion.

9. The process of claim 8 wherein said monomeric mixture comprises acrylonitrile and styrene, and wherein said diene rubber is a linear polybutadiene having a cis-1,4 content of at least 30 up to about 98 weight percent and said unsaturated latex-based rubber is polybutadiene.

* * * * *